(12) United States Patent
Whitecar

(10) Patent No.: US 6,173,166 B1
(45) Date of Patent: Jan. 9, 2001

(54) DETECTION AND CORRECTION OF MULTIPATH IN AN FM RECEIVER

(75) Inventor: John Elliott Whitecar, Plymouth, MI (US)

(73) Assignee: Visteon Global Technologies, Inc., Dearborn, MI (US)

(*) Notice: Under 35 U.S.C. 154(b), the term of this patent shall be extended for 0 days.

(21) Appl. No.: 09/106,330

(22) Filed: Jun. 29, 1998

(51) Int. Cl.$^7$ .................................................. H04Q 7/20
(52) U.S. Cl. ............................ 455/296; 455/65; 375/349
(58) Field of Search ........................... 455/296, 65, 67.3, 455/506, 278.1, 277.2, 306, 307, 303, 312, 205; 381/13, 10, 11; 375/346, 348, 349, 350, 347, 285, 224; 370/252; 380/34

(56) References Cited

U.S. PATENT DOCUMENTS

| | | |
|---|---|---|
| Re. 34,004 * | 7/1992 | Rogoff et al. ........................... 380/34 |
| 4,397,040 | 8/1983 | Jandel et al. . |
| 4,726,073 | 2/1988 | Sessink . |
| 4,742,570 * | 5/1988 | Ichikawa ............................... 455/312 |
| 4,878,252 | 10/1989 | Sessink . |
| 4,910,799 | 3/1990 | Takayama . |
| 4,916,741 * | 4/1990 | Ishikawa ................................ 381/13 |
| 5,068,896 | 11/1991 | Short . |
| 5,287,558 | 2/1994 | Hansen . |
| 5,339,463 | 8/1994 | Hansen . |
| 5,369,470 | 11/1994 | Hansen . |
| 5,379,449 * | 1/1995 | Porambo .............................. 455/277 |
| 5,408,685 * | 4/1995 | Kennedy et al. ....................... 455/65 |
| 5,428,834 * | 6/1995 | Dickerson ............................ 455/304 |
| 5,430,894 * | 7/1995 | Nohara et al. ........................ 455/296 |
| 5,557,646 * | 9/1996 | Honma ................................. 375/346 |
| 5,771,293 * | 6/1998 | Schneider ............................. 381/10 |
| 5,784,465 * | 7/1998 | Fujiwara ............................... 381/10 |
| 5,812,673 * | 9/1998 | Nohara et al. .......................... 381/13 |

* cited by examiner

Primary Examiner—Dwayne Bost
Assistant Examiner—Jean A Gelin
(74) Attorney, Agent, or Firm—Mark Mollon

(57) ABSTRACT

An FM radio receiver predicts the onset of a multipath event based on a derivative of a noise detection signal and then further monitors the multipath event as it progresses. During multipath, an audio output pans between a normal signal path and a multipath smoothed signal path which includes a multipath smoothing filter. If multipath distortion is present long enough, the mixer pans completely over to the smoothing filter path. If the event is weak, only partial panning takes place and mixing is restored to the normal signal path.

10 Claims, 2 Drawing Sheets

US 6,173,166 B1

DETECTION AND CORRECTION OF MULTIPATH IN AN FM RECEIVER

BACKGROUND OF THE INVENTION

The present invention relates in general to detecting and correcting for multipath interference in an FM radio receiver, and more specifically, to faster, more accurate detection of the existence of multipath events and to more effective correction without adding other distortion or undesirable noises.

The problem of multipath distortion in radio receivers is well known. Multipath events occur when radio frequency (RF) signals following a direct path and one or more indirect (i.e., reflected) paths from a transmitter to a receiver interfere with each other at the receiver. Reflections can be caused by hills and buildings, for example.

Constructive and destructive interference of signals caused by interaction between the reflections and the direct line of sight transmission causes both signal distortion and rapid fluctuations in the received field intensity, especially in moving vehicles.

Multipath is a particularly annoying problem in reception of FM stereo broadcasts due to the greater bandwidths of FM stereo broadcasts, corruption of the stereo pilot carrier, and sensitivity to phase errors. Prior art systems respond to multipath conditions by adjusting stereo separation (i.e., blend) and/or adding a high frequency cutoff for the reproduced audio signal. In order to avoid having these measures become noticeable, they are gradually introduced and then gradually eliminated after the multipath conditions cease. Thus, these prior art measures degrade the overall audio signal fidelity even when there is no multipath disturbance present at a particular moment. Thus, prior systems tend to be slow to react at the onset of multipath so that corrections are not put in place in time to prevent multipath distortion from reaching the audio output. Furthermore, the decreased fidelity resulting from the correction measures continue to negatively impact reception at times when they are no longer necessary.

SUMMARY OF THE INVENTION

The present invention has the advantage of more quickly and accurately detecting the presence of multipath and then applying a signal correction which is more coordinated with the multipath event itself.

In one aspect of the invention, a method of detecting multipath events in a received radio broadcast signal allows much quicker identification of multipath events. An instantaneous noise energy of the broadcast signal is determined. A derivative of the instantaneous noise energy is then determined. A modulation energy of the broadcast signal is also determined. Finally, a multipath detection signal is generated if the derivative is greater than a threshold which has a value proportional to the modulation energy. By using the derivative of the noise energy, the multipath detector can detect a rising noise floor before the noise is actually perceivable by the listener.

In a second aspect of the invention, improved signal correction is obtained using a panning technique. The broadcast signal is demodulated to generate a demodulated signal. The demodulated signal is split into first and second paths. A multipath smoothing filter is applied to the second path. The first and second paths are recombined by panning between the first and second paths in response to the multipath detection signal.

DETAILED DESCRIPTION OF PREFERRED EMBODIMENTS

Figure 1:
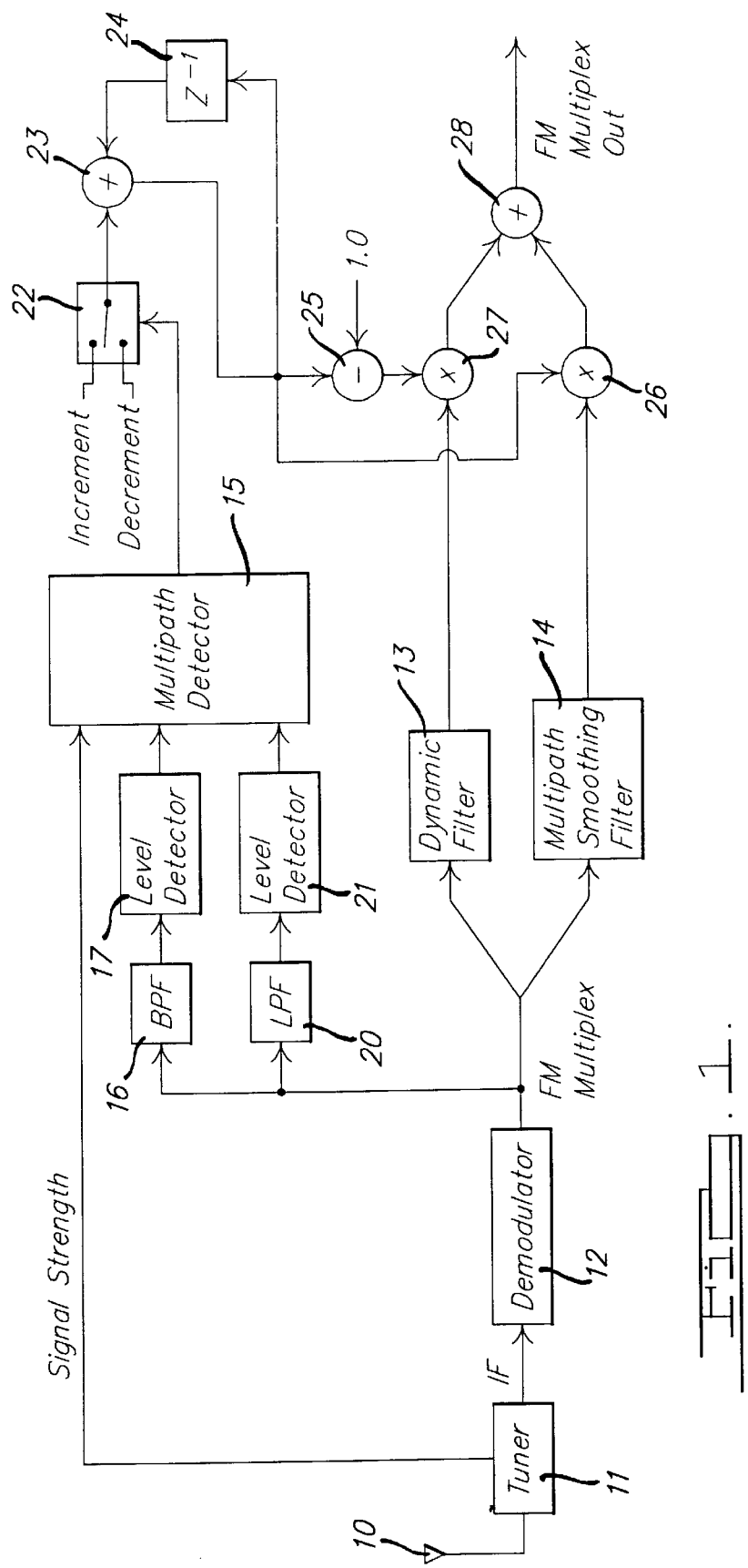
FIG. 1 is a block diagram showing an FM radio receiver according to the present invention.

An FM radio receiver shown in FIG. 1 includes an antenna 10 for providing broadcast signals to a tuner 11. Tuner 11 provides an intermediate frequency (IF) output signal for a broadcast signal at a user-selected frequency. In a preferred embodiment, the radio receiver uses digital signal processing (DSP) for the IF signal which would first be digitized and then provided to a demodulator 12.

Demodulator 12 produces an FM multiplex signal including stereo sum and difference channels and a stereo pilot signal. The FM multiplex signal is split into a first path including a dynamic filter 13 and a second path including a multipath smoothing filter 14. Dynamic filter 13 provides dynamic noise reduction by using a variable bandwidth filter controlled according to actual signal content of the received signal, an example of which is shown in co-pending U.S. application Ser. No. (197-0828). Multipath smoothing filter 14 is preferably comprised of a second order lowpass filter having an upper cutoff frequency selected to remove the majority of multipath distortion effects (e.g., about 4 kHz). The split signals from filters 13 and 14 are recombined as determined in accordance with multipath conditions as will be described below.

Tuner 11 provides an RF signal strength signal (digitized in the preferred DSP embodiment) to a multipath detector 15. Several different aspects of the received signal are examined by multipath detector 15 in order to identify the various stages of a multipath event.

The FM multiplex signal from the demodulator 12 is coupled to a bandpass filter 16 which selects a frequency range where multipath distortion noise creates noise energy (i.e., from about 90 kHz to about 240 kHz). The isolated noise signal from bandpass filter 16 is provided to a level detector 17 which detects an instantaneous noise energy and provides a noise energy signal to multipath detector 15.

The FM multiplex signal is also coupled to a lowpass filter 20 having an upper cutoff frequency of about 15 kHz to isolate the audio sum channel to allow a modulation energy to be determined in a level detector 21. A modulation energy signal is also provided to multipath detector 15.

Level detectors 17 and 21 may preferably each be comprised of a rectifier and an averager in order to determine the noise and modulation energy levels, respectively. In a preferred DSP embodiment, the respective energy levels may be determined according to a moving average formula having the form;

$$\text{Level}_n = b \times |\text{sample}_n| + a \times \text{Level}_{n-1}$$

where constants b and a are chosen to achieve a specific response time, e.g., about 10 milliseconds.

Multipath detector 15 preferably employs several multipath detection tests. In response to these tests, a multipath detection signal is produced by multipath detector 15 and provided to a control input of a multiplexer switch 22. Multiplexer 22 controls a panning direction in the recombination of the normal signal path and the multipath smoothed signal path. Separate increment and decrement constants are provided to respective inputs of multiplexer 22. The value of the increment constant is relatively greater than the decrement constant in order to provide panning toward the multipath smoothed signal path more quickly than a panning rate used to return to the normal signal path. The selected increment or decrement constant is provided from multiplexer 22 to one input of an adder/accumulator 23. The output of adder/accumulator 23 is coupled through a delay block 24 to a second input of adder/accumulator 23 so that each new value of the output of adder/accumulator 23 equals its previous value modified by either the increment or decrement constant. The output of adder/accumulator 23, however, is limited to the range of between zero and one.

The output of adder/accumulator 23 is also coupled to one input of a subtractor 25 and to one input of a multiplier 26. A constant value of 1.0 is supplied to a second input of subtractor 25 and the output of subtractor 25 is provided to one input of a multiplier 27. The outputs of multipliers 26 and 27 are added together by a summer 28 which produces an FM multiplex output signal.

The output of adder/accumulator 23 is a value equal to or between zero and one which is indicative of the severity of multipath events. A zero value indicates that no multipath is present. With a zero value, the output of multiplier 26 is zero and the FM multiplex output signal consists of a 100% contribution from the normal signal path and no contribution from the multipath smoothed signal path. Since the output of subtractor 25 equals one (i.e., 1.0−0=1.0), the normal signal passes through multiplier 27 without attenuation.

In the presence of multipath events, multiplexer 22 is switched to the increment constant and the value of the output of adder/accumulator 23 increases at a predetermined rate. As the value in adder/accumulator 23 increases, the content of the FM multiplex output signal pans toward the multipath smoothed signal path and away from the normal signal path. Since the sum of the multiplier values input to multipliers 26 and 27 is one, the panning results in no overall change in gain.

When multipath is no longer detected, multiplexer 22 switches back to the decrement constant and the FM multiplex output signal pans back toward the normal signal path at a slower predetermined rate. When a value of zero is reached in adder/accumulator 23, its value is held there either by a software checking routine or by virtue of an inherent limit in adder/accumulator 23 itself.

Figure 2:
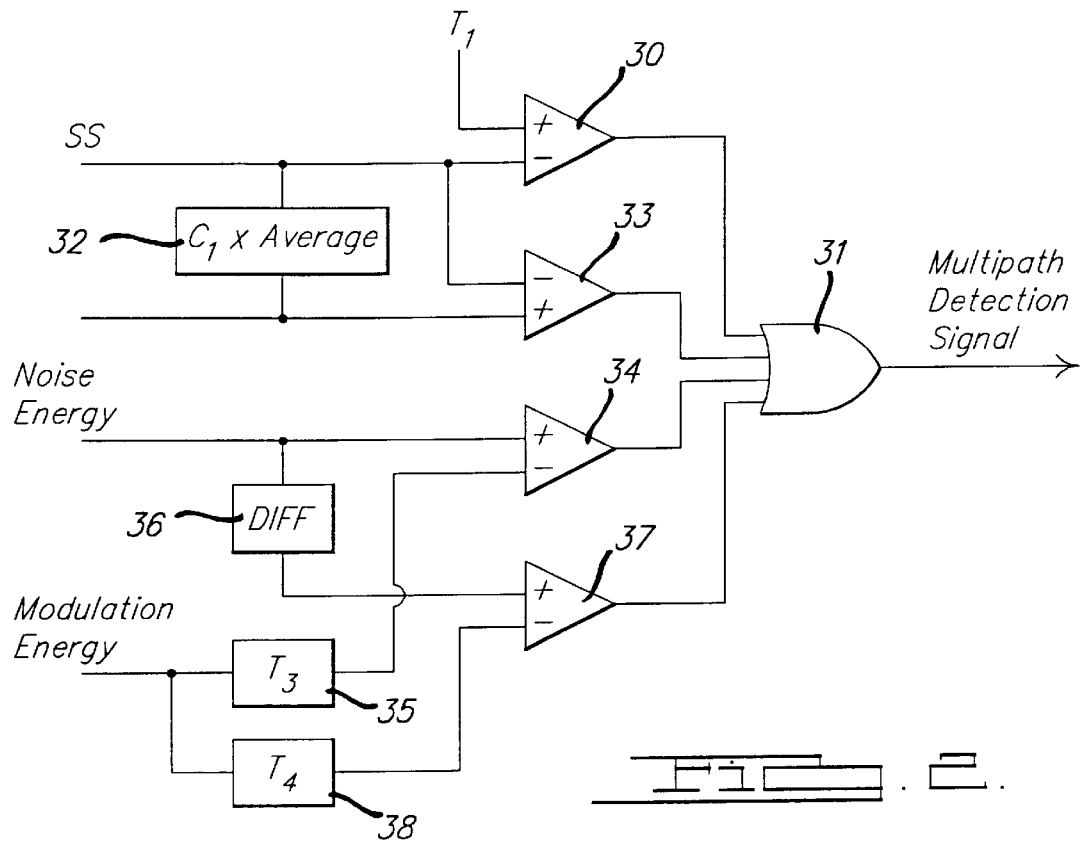
FIG. 2 is a schematic, block diagram showing the multipath detector of FIG. 1 in greater detail.

A preferred embodiment of multipath detector 15 is shown in FIG. 2. Four separate conditions are detected, any one of which can trigger the multipath detection signal. Each condition is sensitive to a separate element of a multipath event.

Destructive interference during a multipath event can cause the received signal strength to decrease. Thus, the signal strength signal SS is coupled to the inverting input of a comparator 30 for comparing with a threshold $T_1$ which is coupled to the non-inverting input of the comparator. When the signal strength falls below the value of threshold $T_1$, the output of comparator 30 goes to a high logic level which is coupled through an OR-gate 31 as the multipath detection signal.

The signal strength signal is also coupled to an averager block 32 which determines a percentage value of the average signal strength. The percentage of average is determined by multiplying a constant $c_1$ by a running signal average. This percent of average is coupled to the non-inverting input of a comparator 33. The signal strength signal SS is provided to the inverting input of comparator 33. Thus, whenever the instantaneous signal strength drops below the percentage of average signal strength, comparator 33 switches to a high logic level thereby triggering OR-gate 31 to produce the multipath detection signal.

Besides changes in instantaneous signal strength, the presence of multipath distortion gives rise to high frequency noise energy which is detected in comparator 34. The noise energy signal from level detector 21 (FIG. 1) is coupled to the non-inverting input of comparator 34. The noise and energy is compared with a variable threshold proportional to modulation energy from level detector 17. Thus, the modulation energy signal is coupled to a threshold block 35 for calculating a threshold $T_3$ which is then coupled to the inverting input of comparator 34. Preferably, threshold $T_3$ is calculated as a base threshold value plus a predetermined percentage of the modulation energy signal. As a result, the multipath detection threshold is raised in the presence of high signal modulation since the high level of modulation tends to mask the multipath generated distortion. If the noise energy signal exceeds this variable threshold, then the output of comparator 34 produces a high logic level which is coupled to OR-gate 31 thereby producing a multipath detection signal.

In order to get an early first warning of the onset of multipath, the present invention employs a differentiator 36 which differentiates the noise energy signal and provides a derivative to the non-inverting input of a comparator 37. Preferably, differentiator 36 forms the second derivative of the noise energy signal in order to detect the acceleration in noise energy increase. The modulation energy signal is provided to a threshold block 38 which calculates a threshold $T_4$ which is coupled to the inverting input of comparator 37. Threshold $T_4$ is also determined based on a base threshold plus a predetermined percentage of the modulation energy signal. When the derivative signal exceeds this threshold $T_4$, the output of comparator 37 generates a high level logic signal to turn on OR-gate 31 and produce a multipath detection signal.

By combining the four separate conditions into one multipath detector, the multipath detection signal identifies the onset of a multipath event very quickly and continues to detect multipath distortion during the progress of the event. Once all four conditions indicate that the multipath event has passed, the multipath detection signal is immediately turned off.

Figure 3:
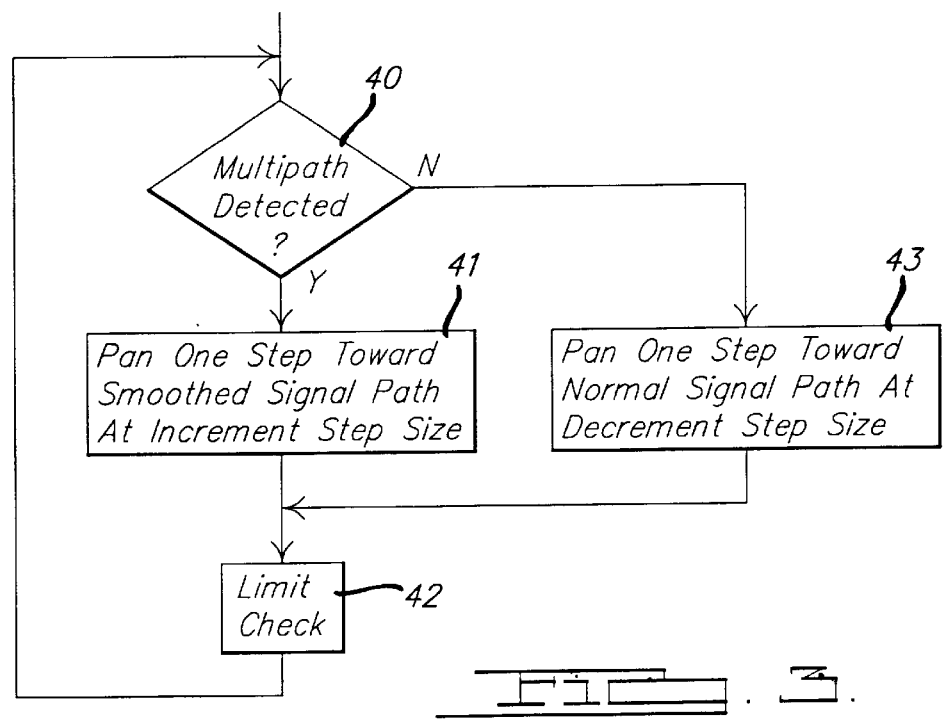
FIG. 3 is a flowchart illustrating the method of performing signal correction of the present invention.

A preferred embodiment of the panning method of the present invention is shown in FIG. 3. In step 40, a check is made to determine whether multipath events are detected. If multipath is detected, then the panning circuit of FIG. 1 pans one step toward the smoothed multipath signal path at the incremental step size in step 41. In step 42, a limit check is made to insure that the panning value has not gone outside the range of not less than zero and not more than one. If multipath is not detected in step 40, then the panning circuit pans one step toward the normal path at the decremental step size in step 43. The limit check is again conducted in step 42 and a return is made to step 40 to continue monitoring for multipath conditions.

As shown by the foregoing, any of four conditions can trigger the multipath detector. When a multipath event is detected, an accumulator is incremented at a predetermined incremental rate. When the multipath event is passed, the accumulator decrements at a slower decremental rate. The accumulator controls an audio mixer which pans between two inputs; a normal audio path and a multipath-reduced and smoothed path. By using the derivative or second derivative of the noise detection signal, the multipath detector detects a rising noise floor before the noise is actually perceivable by the listener. This provides a first warning to start panning towards the multipath smoothing filter. If the multipath distortion is present long enough, the mixer will pan completely over to the multipath smoothing path. If the event is weak, the mixer will only partially pan to the smoothing filter path. By panning at a controlled rate between the two audio signal paths, audible ticks are avoided which would otherwise be present in a switching operation. Furthermore, the placing of the multipath smoothing filter in parallel with the normal dynamic filter reduces relative phase delay between the two signal paths which further reduces audible ticks.

The multipath smoothing path may also provide other multipath distortion reduction actions, such as a reduction in gain (i.e., partial muting) during the multipath event.

What is claimed is:

1. A method of detecting multipath events in a received radio broadcast signal comprising the steps of:

determining an instantaneous noise energy of said broadcast signal;

determining a derivative of said instantaneous noise energy;

determining a modulation energy of said broadcast signal;

generating a multipath detection signal if said derivative is greater than a threshold having a value proportional to said modulation energy.

2. The method of claim 1 wherein said derivative is a second derivative.

3. The method of claim 1 wherein said threshold is substantially equal to a base threshold plus a multiplication product of a predetermined constant and said modulation energy.

4. A method of detecting multipath events in a received radio broadcast signal and modifying reception in a radio receiver to reduce distortion from said multipath events, said method comprising the steps of:

determining an instantaneous noise energy of said broadcast signal;

determining a derivative of said instantaneous noise energy;

determining a modulation energy of said broadcast signal;

generating a multipath detection signal if said derivative is greater than a threshold having a value proportional to said modulation energy;

demodulating said broadcast signal to generate a demodulated signal;

splitting said demodulated signal into first and second paths;

applying a multipath smoothing filter to said second path;

recombining said first and second paths by panning between said first and second paths in response to said multipath detection signal.

5. The method of claim 4 wherein said recombining step is comprised of:

panning from said first path to said second path during said multipath detection signal at a first panning rate; and panning from said second path to said first path when said multipath signal is absent at a second panning rate which is slower than said first panning rate.

6. A method of detecting multipath events in a received radio broadcast signal comprising the steps of:

determining an instantaneous signal strength of said broadcast signal;

determining an average of said instantaneous signal strength;

determining an instantaneous noise energy of said broadcast signal;

determining a derivative of said instantaneous noise energy;

determining a modulation energy of said broadcast signal;

generating a first signal if said instantaneous signal strength is less than a first threshold having a fixed value;

generating a second signal if said instantaneous signal strength is less than a second threshold having a value proportional to a percentage of said average instantaneous signal strength;

generating a third signal if said instantaneous noise energy is greater than a third threshold having a value proportional to said modulation energy;

generating a fourth signal if said derivative is greater than a fourth threshold having a value proportional to said modulation energy; and generating a multipath detection signal when any of said first, second, third, or fourth signals are being generated.

7. The method of claim 6 wherein said derivative is a second derivative.

8. The method of claim 6 wherein said fourth threshold is substantially equal to a base threshold plus a multiplication product of a predetermined constant and said modulation energy.

9. A radio receiver comprising:

a noise detector determining an instantaneous noise energy of said broadcast signal;

a differentiator determining a derivative of said instantaneous noise energy;

a modulation detector determining a modulation energy of said broadcast signal;

a threshold generator generating a threshold having a value proportional to said modulation energy; and a comparator comparing said derivative to said threshold, said comparator generating a multipath detection signal if said derivative is greater than said threshold.

10. The radio receiver of claim 9 further comprising:

a demodulator demodulating said broadcast signal to generate a demodulated signal;

a multipath smoothing filter filtering said demodulated signal;

a recombiner panning between said demodulated signal with and without said smoothing filtering in response to said multipath detection signal.

* * * * *